(12) United States Patent
Deily et al.

(10) Patent No.: US 7,676,699 B2
(45) Date of Patent: Mar. 9, 2010

(54) EVENT TRACE CONDITIONAL LOGGING

(75) Inventors: Eric D. Deily, Issaquah, WA (US); Jaroslav Dunajsky, Redmond, WA (US); Wade A. Hilmo, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 512 days.

(21) Appl. No.: 11/380,858

(22) Filed: Apr. 28, 2006

(65) Prior Publication Data

US 2007/0255979 A1 Nov. 1, 2007

(51) Int. Cl.
*G06F 11/00* (2006.01)
(52) U.S. Cl. ....................................................... 714/39
(58) Field of Classification Search ................ 714/39
See application file for complete search history.

(56) References Cited

U.S. PATENT DOCUMENTS

| | | | | |
|---|---|---|---|---|
| 5,608,720 A | * | 3/1997 | Biegel et al. ................ 370/249 |
| 6,470,388 B1 | * | 10/2002 | Niemi et al. ................ 709/224 |
| 7,346,812 B1 | * | 3/2008 | Wickeraad .................... 714/48 |
| 2006/0277447 A1 | * | 12/2006 | Martin et al. ................. 714/55 |

OTHER PUBLICATIONS

Mark W. Johnson, "The Application Response Measurement (ARM) API, Version 2", Dec. 1997, Trivoli Systems.*

* cited by examiner

*Primary Examiner*—Scott T Baderman
*Assistant Examiner*—Jigar Patel
(74) *Attorney, Agent, or Firm*—Workman Nydegger

(57) ABSTRACT

Use of configuration information to specify particular conditions under which trace events are to be logged. When accessing trace events generated by various modules, configuration data is referred to specifying condition(s) under which the trace events should be logged. If the log condition(s) are satisfied, the trace events are logged. Otherwise, they may be discarded. Thus, the number of trace events in the log may be significantly reduced to those trace events that satisfy conditions of interest to an evaluator.

15 Claims, 4 Drawing Sheets

EVENT TRACE CONDITIONAL LOGGING

BACKGROUND

On occasion, it is useful to evaluate the functionality of one or more software modules. For instance, despite extraordinary efforts, complex software may sometimes not function as intended. In such cases, one may want to evaluate how the software performed leading up to the time that the software deviated from ideal function. In order to assist in this process, software modules under evaluation may generate event traces that represent a record of actions taken or experienced by the software module.

For instance, suppose that a service handles a number of service requests. Most of the time, the service may operate quite normally. On a rare occasion, the service may experience a problem in performance. Each time the service receives such a request, a number of modules of the service perform appropriate processing. While performing the processing, a number of service modules may generate a large number of trace events. Regardless of whether the service is operating normally or is experience a rare problem, the trace events are logged.

If the service performs normally most of the time, and just happed to fail on a rare occasion, the log will thus be filled with a large number of trace events, most of which being quite uninteresting since they only describe actions expected of a normally operating service. Thus, if the service does experience a problem, one evaluating the trace log might be overburdened with too much irrelevant information. The individual would have to scan through the trace events to first identify the trace events that are more relevant to the service failure. This might be quite a significant challenge for a service that functions properly the vast majority of the time.

Even if the service had not experience a failure, an evaluator of the service might be interested in a particular aspect of the service performance. Only a few of the trace events generated by the service might be relevant to that particular aspect of performance. The evaluator would still have to filter through the trace events to identify those trace events of interest.

BRIEF SUMMARY

Although not required, embodiments of the present invention relate to the use of configuration information to specify particular conditions under which trace events are to be logged. If it is determined that a log condition is met for a particular group of buffered trace events generated as a result of processing a request, at least some of those buffered trace events are then persisted to the log. Otherwise, the buffered trace events may be discarded. This may significantly reduce the number of logged trace events and increase the relevance of the logged trace events if the log conditions are chosen carefully. Accordingly, the reduced size of the log saves memory or storage space, and eases the process of interpreting the log. Optionally, the trace events that are raised and buffered may be scoped to within particular characteristics. Thus, relatively fewer trace events may be buffered, thereby preserving the processing and memory resources associated with raising and buffering the trace events.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The appended drawings are used in order to more particularly describe embodiments of the present invention. Understanding that these drawings depict only typical embodiments of the invention and are not therefore to be considered to be limiting of its scope, the embodiments will be described and explained with additional specificity and detail through the use of the accompanying drawings in which.

DETAILED DESCRIPTION

Figure 1:
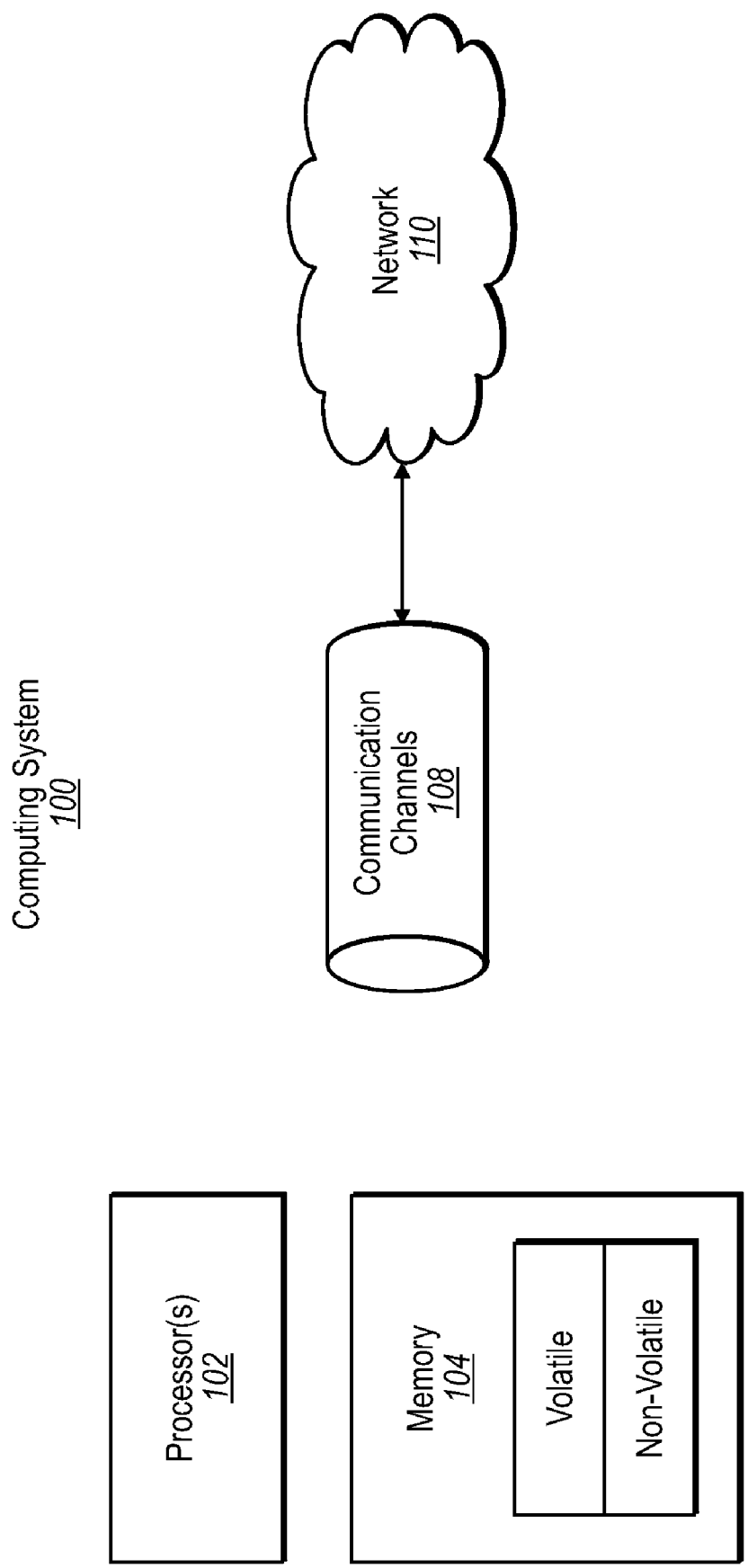
FIG. 1 illustrates a computing system in which embodiments of the principles of the present invention may operate.

Embodiment of the present invention extend to the use of configuration data to specify one or more buffering and/or log conditions for trace events. The embodiments of the present invention may comprise a special purpose or general-purpose computer including various computer hardware, as discussed in greater detail below. FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
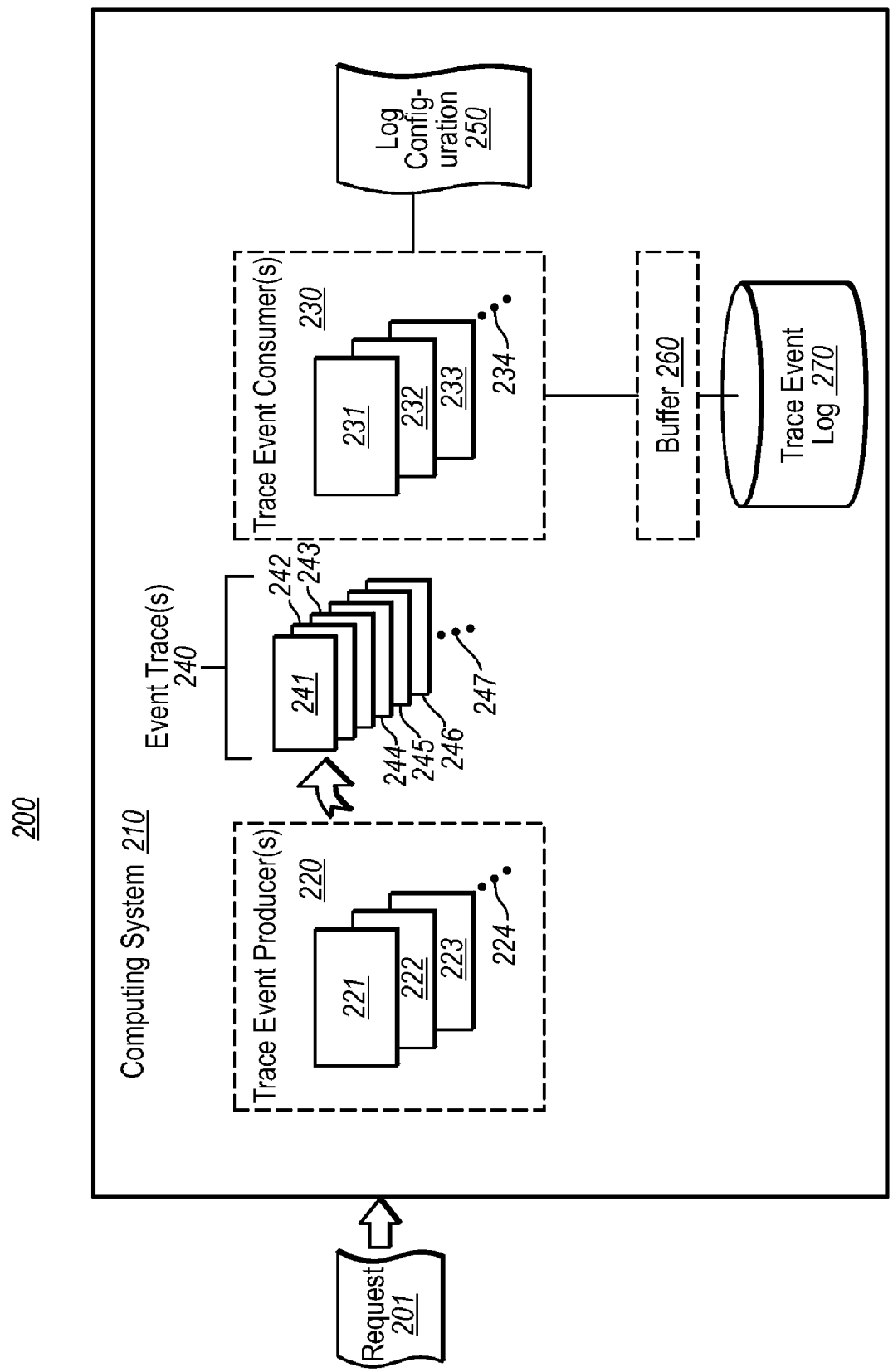
FIG. 2 schematically illustrates an environment in which embodiments of the present invention may operate including a number of event producers generating event traces while processing a request, and a number of event consumers that log the event traces in accordance with log conditions specified in configuration data.

FIG. 2 illustrates an environment 200 in which embodiments of the present invention may be employed. The environment 200 includes a computing system 210. In one embodiment, the computing system 210 receives a number of requests such as, for example, request 201. The requests might be received over a network if the computing system 210 offered a network service, or the request may be a local request such as, for example, a function call. Thus a request may be any unit of processable work.

The computing system includes one or more trace event producers 220 and one or more trace event consumers 230. Each of the trace event producers 220 and trace event consumer 230 may be a software component or a combination of interacting software components. The trace event producers 220 are illustrated as including three trace event producers 221, 222 and 223. However, the ellipses 224 is included to symbolically represent that there may be more trace event producers or even fewer trace event producers within the trace event producers 220. There may be even one single trace event producer within the trace event producers. Similarly, although there are three trace event consumers 241, 242 and 243 shown within trace event consumers 240, the trace event consumers 240 may include any number one or more of trace event consumers.

In response to processing request 201, the trace event producers 220 may generate a large number of trace events 240. In this example, the trace event producers 220 are illustrated as generating trace events 241 through 246. However, there may be fewer, but often many more trace events generated as represented by the ellipses 247.

Each trace event producer 220 may have access (directly or indirectly) to configuration data 250 that identifies characteristics of trace events that should be raised. The data ultimately accessed by the trace event producer 220 may be in the same form, or perhaps in a different form, as the information was represented in the configuration data 250. In one embodiment, the event consumer that receives the raised trace event automatically buffers any trace event the event consumer receives. Accordingly, the determination of whether or not an event producer should raise a trace event to be consumed by that event consumer is equivalent to a determination of whether or not to buffer such trace events.

Figure 4:
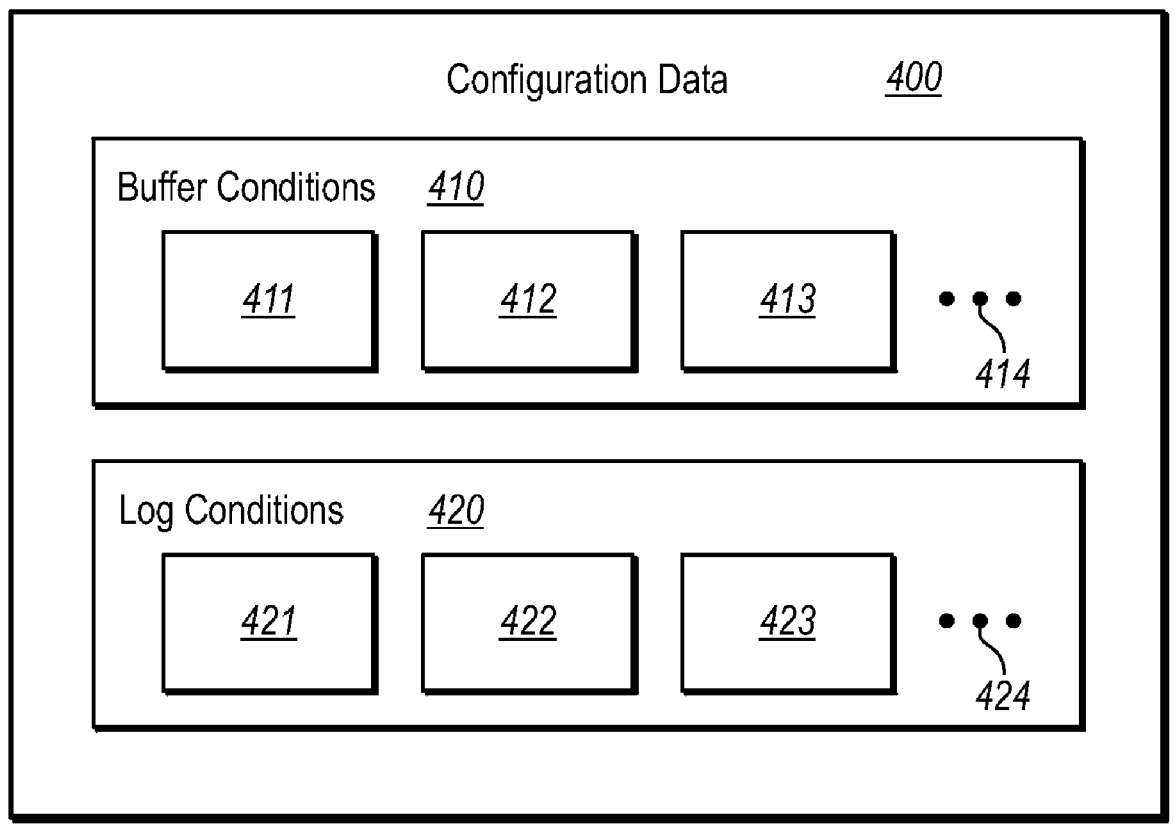
FIG. 4 illustrates a data structure of a buffering and log condition configuration data structure in accordance with embodiments of the present invention.

Referring to FIG. 4, the trace event producers 220 may be more interested in the buffer conditions 410, which specifies conditions (such as conditions 411, 412, 413 amongst others 414) for raising or buffering trace events, or specifies characteristics of trace events to be raised. For instance, the conditions or characteristics might include an identification of the requested Uniform Resource Locator or other source of the trace events that are to be raised and buffered, an identification of the verbosity level of the trace event to be raised and buffered, or a category of trace events that are to be raised and buffered.

For example, the buffer conditions 410 might specify that only trace events associated with authentication should be raised and buffered for requests directed towards a particular Uniform Resource Locator. Additionally or alternatively, the buffer conditions 410 might specify that only trace events that rise to a warning or error verbosity level should be raised and buffered. This scoping of the trace events raised and buffered can reduce substantially the number of trace events generated and buffered by potentially orders of magnitude. Accordingly, significant processing and memory resources may be conserved for the often more important task of processing the request 201 itself. Thus, if the conditions for raising and buffering trace events are carefully chosen to suit the information of interest, the trace events of interest may be buffered without significantly slowing the processing of the request.

Alternatively or in addition, the trace events may always be raised, with the trace consumers 230 evaluating the configuration file 250 to identify whether or not each trace event for a given processing request should be buffered in the buffer 260. For instance, one or more of the trace event consumers 230 may evaluate the buffer conditions 410 of the configuration data 400 in order to identify the conditions for buffering.

Additionally, each trace event consumer 230 may have access to the log conditions 420 of the configuration data 400 (or configuration data 250) that specifies conditions (including conditions 421, 422, 423 amongst potentially others 424) for logging buffered trace events that resulted from the processing of the request.

For instance, the log conditions 420 might specify a time frame within which time processing associated with a request should be completed. Otherwise, the trace events generated as a result of processing the associated processing request will be logged. A typical example might be that the trace events for a request should be logged if the processing of the request is not completed within a configurable time that it should have been completed in normal operation. For instance, 5 milliseconds of processing time may imply an error in the request processing on some computing systems, whereas 2 seconds of processing time may imply an error in another environment.

Alternatively or in addition, the log conditions 420 might specify an event verbosity level (e.g., informational, warning, or error in order of increasing levels of severity) that, if present for a particular number of the trace events generated as a result of processing the request, the trace events should be logged. For instance, the log conditions might specify that if there are one or more event traces associated with request processing that have an "error" verbosity level, that all event traces associated with the processing of the request should be logged. Alternatively, the conditions might specify that under these same conditions, that only the error conditions preceded by the preceding 3 trace events might be logged. Thus, in one embodiment, not all of the buffered trace events for a particular request will be logged.

Furthermore, the log conditions 420 might specify that if an execution condition is encountered, a prerequisite for logging is not met, or that specifies that if the execution condition is encountered a prerequisite for logging is met. For instance, the log conditions might specify that if multiple processors were involved with processing the request, that the associated event traces (or a specified portion) are to be logged even if the request was otherwise successfully completed. Alternatively, the log conditions might specify that if processing of the request resulted in the use of more than a certain amount of memory, or used a particular interrupt, or engaged in harmful activities, that the associated trace events (or a portion thereof) are to be logged.

Figure 3A:
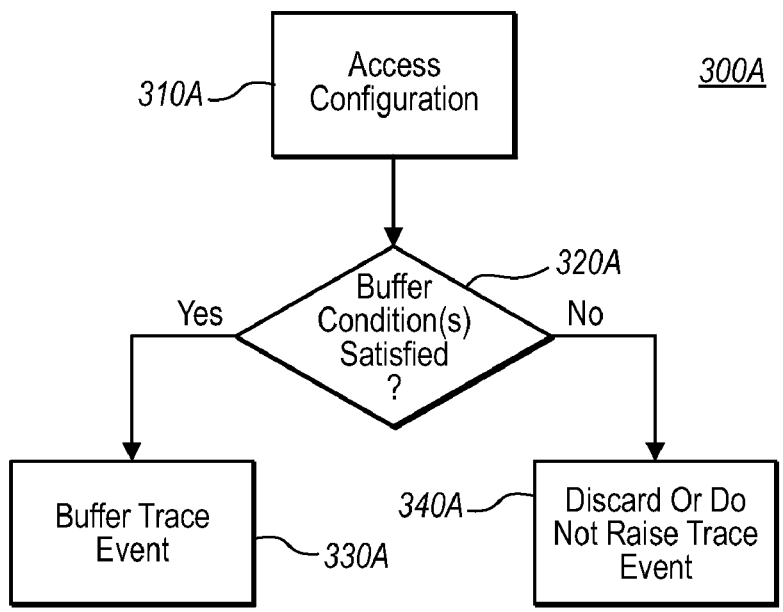
FIG. 3A illustrates a flowchart of a method for conditionally buffering event traces in accordance with embodiments of the present invention.

FIG. 3A illustrates a flowchart of a method 300 for conditionally raising (if the performed by event producers) or buffering (if performed by the event consumers) of trace events in accordance with the principles of the present invention. As the method 300A may be performed in the context of the environment 200 of FIG. 2, the method 300A of FIG. 3A will now be described with frequent reference to FIG. 2.

As previously mentioned, the trace event producers 220 have access to a configuration data 250. Accordingly, the method 300A of FIG. 3A includes an act of accessing configuration data that specifies one or more buffer conditions under which trace events are to be logged (act 310A). This act could be viewed as the equivalent of simply identifying characteristics of trace events to be raised if the raised trace events destined for a given trace event consumer are automatically buffered. Alternatively or in addition, this act could be viewed as the equivalent of one of the event consumers using the configuration data to identify whether or not a raised trace event is to be buffered.

It is then determined whether or not to buffer the trace events (decision block 320A). This determination may be performed by an event producer 220 or event consumer 230 as mentioned above. If the trace event is to be buffered (Yes in decision block 320A), then the trace event is placed in the buffer 260 (act 330A). Otherwise (No in decision block 320A), the trace event is discarded or never raised in the first place (act 340A).

Figure 3B:
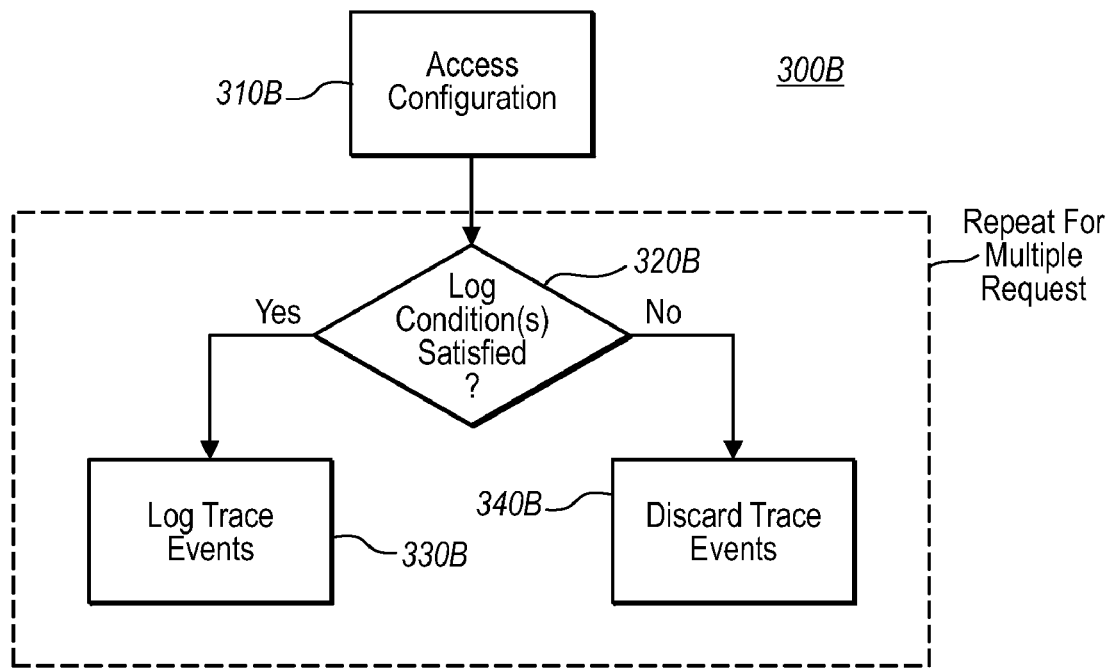
FIG. 3B illustrates a flowchart of a method for conditionally logging buffered trace events generated as a result of processing a request.

Referring now to FIG. 3B, the method 300B of FIG. 3B includes an act of accessing configuration data that specifies one or more log conditions under which trace events are to be logged (act 310B). If the log conditions for a particular request are met (Yes in decision block 320B), all (or a specified portion) of the trace events that resulted from the execution of the particular request are then logged (act 330B) for example, in log 270. Otherwise (No in decision block 320B), the trace events for that request are discarded (act 340). Discarding may include physically erasing the data, or rendering the data useless as when for example removing or altering the pointer to the data.

Thus, the log configuration conditions control what is logged, when it is logged, and what is discarded. The log configuration may be designed such that only the trace events that meet some condition of interest are logged. Therefore, the log is not congested with trace events of little or no interest. This makes it an easier task to evaluate the trace events in the log by improving the average relevancy of each trace event. In one embodiment, the configuration data 250 may be represented as an eXtensible Markup Language (XML) document that may be altered and edited as appropriate by another application or even by a user to design appropriate buffering and logging conditions.

Although methods have been described with respect to FIGS. 3A and 3B, the principles of the present invention extend to computer program product comprising one or more computer-readable media having thereon one or more computer-executable instructions that, when executed by one or more processors of the server computing system, cause the computing system to perform all or portions or either or both of these methods. For instance, referring to FIG. 1, memory 104 and communication channels 108 may represent examples of such computer-readable media. The memory 104 represents an example of physical computer-readable media in the form of physical storage and/or memory media. The principles of the present invention also extend to computing systems themselves that are configured through hardware, software, or a combination of hardware and software, to perform all of portions of the method of FIG. 3 and the associated description.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage media having stored thereon computer-executable instructions that, when executed by one or more processors of a computing system cause the computing system to perform a method for conditionally logging trace events, the method comprising:

in response to a receiving a processing request at the computing system, an act of accessing configuration data, wherein the configuration data specifies one or more characteristics of trace events and one or more log conditions under which the trace events are to be persisted to a log, wherein the one or more log conditions include at least one log condition trigging persisting of trace events to a log only when at least two processors are involved in processing the request;

in response to receiving the processing request, an act of identifying trace events associated with the processing request that correspond to the trace events specified in the configuration data;

an act of determining that the characteristics of the trace events in the configuration data are met and, in response, raising trace events, the trace events being raised consisting of those identified as being associated with the processing request and corresponding to the trace events specified in the configuration data;

an act of buffering all raised trace events identified as being associated with the processing request and corresponding to the trace events specified in the configuration data;

an act of determining if the one or more log conditions are satisfied;

in response to the one or more log conditions being satisfied, an act of logging to the log at least some of a plurality of the buffered raised trace events that were generated in the course of processing the request; and in response to the one or more log conditions not being satisfied, an act of discarding at least some of the plurality of trace events that were generated in the course of processing the request.

2. A computer program product in accordance with claim 1, wherein the one or more log conditions comprises a first log condition that specifies a time frame within which time processing associated with a processing request should be completed.

3. A computer program product in accordance with claim 2, wherein the one or more log conditions further specifies a second condition that specifies an event verbosity level that if present for at least one of the at least some of the plurality of trace events, the verbosity level satisfies a prerequisite for logging to the log.

4. A computer program product in accordance with claim 3, wherein the one or more log conditions further specifies a third condition that specifies that if an execution condition is encountered a prerequisite for logging is not met, or that specifies that if the execution condition is encountered a prerequisite for logging is met.

5. A computer program product in accordance with claim 1, wherein the one or more log conditions further specifies a first condition that specifies an event verbosity level that if present for at least one of the at least some of the plurality of trace events, the verbosity level satisfies a prerequisite for logging to the log, or if present for all of the at least some of the plurality of trace events, the verbosity level does not satisfy a prerequisite for logging to the log.

6. A computer program product in accordance with claim 5, wherein the one or more log conditions further specifies a second condition that specifies that if an execution condition is encountered a prerequisite for logging is not met, or that specifies that if the execution condition is encountered a prerequisite for logging is met.

7. A computer program product in accordance with claim 1, wherein the one or more log conditions further specifies that if an execution condition is encountered a prerequisite for logging is not met, or that specifies that if the execution condition is encountered a prerequisite for logging is met.

8. A computer program product in accordance with claim 1, wherein at least one of the identified characteristics is an identification of a source of the trace events.

9. A computer program product in accordance with claim 8, wherein at least one of the identified characteristics is a verbosity level of the trace events.

10. A computer program product in accordance with claim 9, wherein at least one of the identified characteristics is a category of the trace events.

11. A computer program product in accordance with claim 1, wherein at least one of the identified characteristics is a verbosity level of the trace events.

12. A computer program product in accordance with claim 11, wherein at least one of the identified characteristics is a category of the trace events.

13. A computer program product in accordance with claim 1, wherein at least one of the identified characteristics is a category of the trace events.

14. A computer program product in accordance with claim 1, wherein the one or more computer-readable storage media are physical memory media.

15. The computer program product in accordance with claim 1, wherein at least one of the one or more log conditions specifies a particular verbosity of the buffered trace events and a predetermined number of instances of the particular verbosity of trace events, that when exceeded specifies that a prerequisite for logging is met.

* * * * *